April 15, 1941.   J. T. HAYNSWORTH, JR., ET AL   2,238,113
SELECTOR MECHANISM
Filed Nov. 5, 1937         4 Sheets-Sheet 1
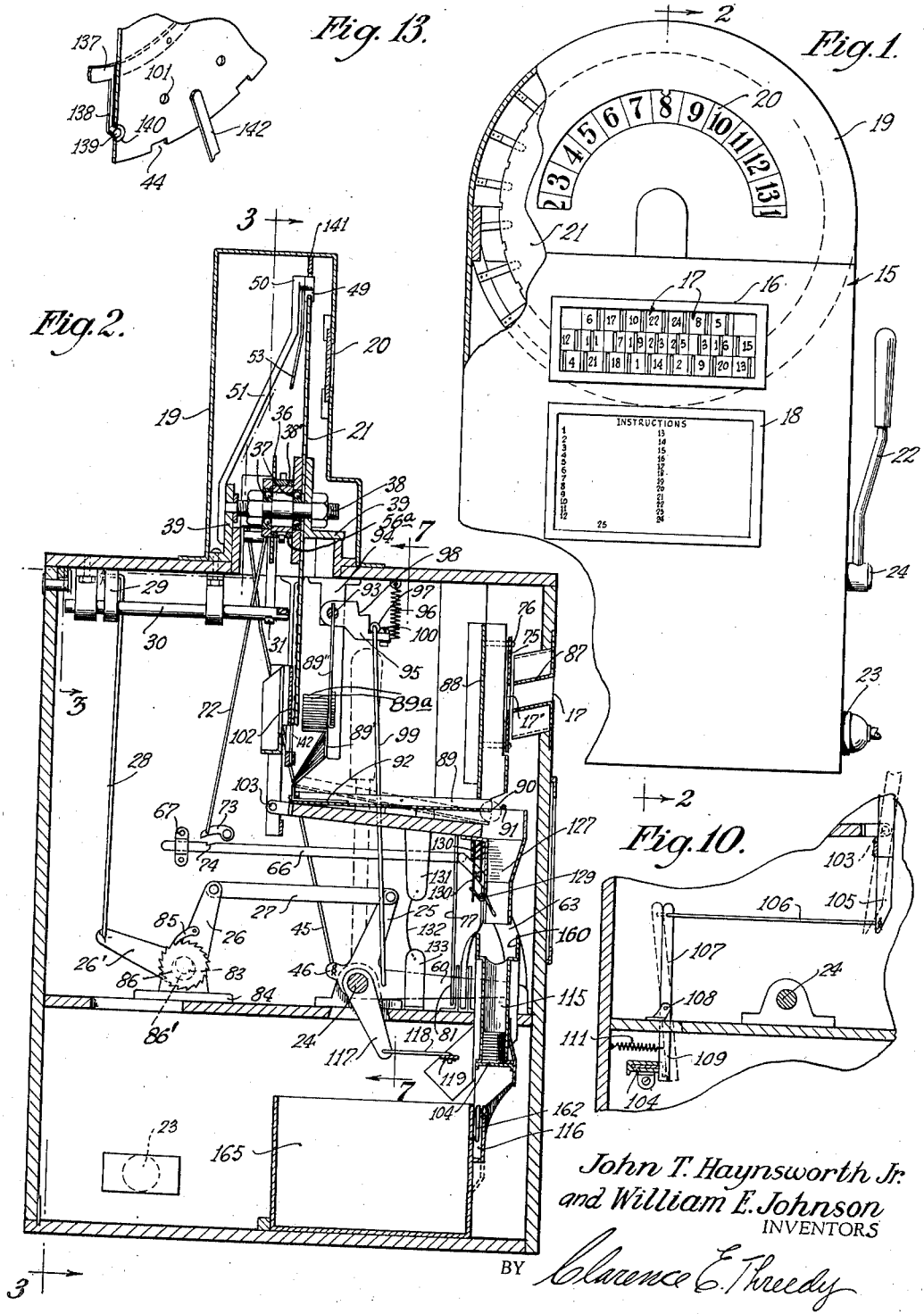
John T. Haynsworth Jr.
and William E. Johnson
INVENTORS
BY Clarence E. Threedy
THEIR ATTORNEY.

April 15, 1941. J. T. HAYNSWORTH, JR., ET AL 2,238,113
SELECTOR MECHANISM
Filed Nov. 5, 1937 4 Sheets-Sheet 2
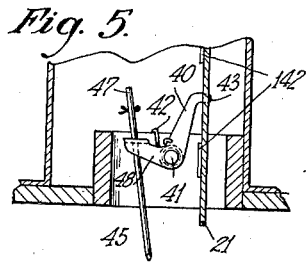
Fig. 5.
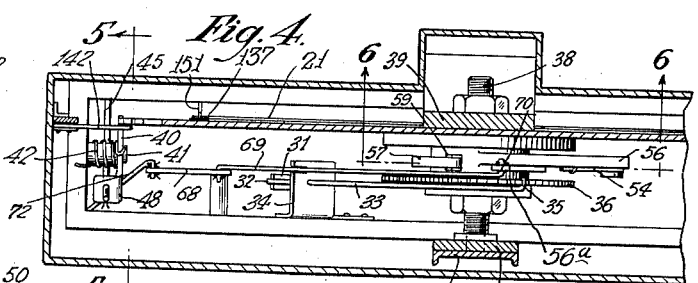
Fig. 4.
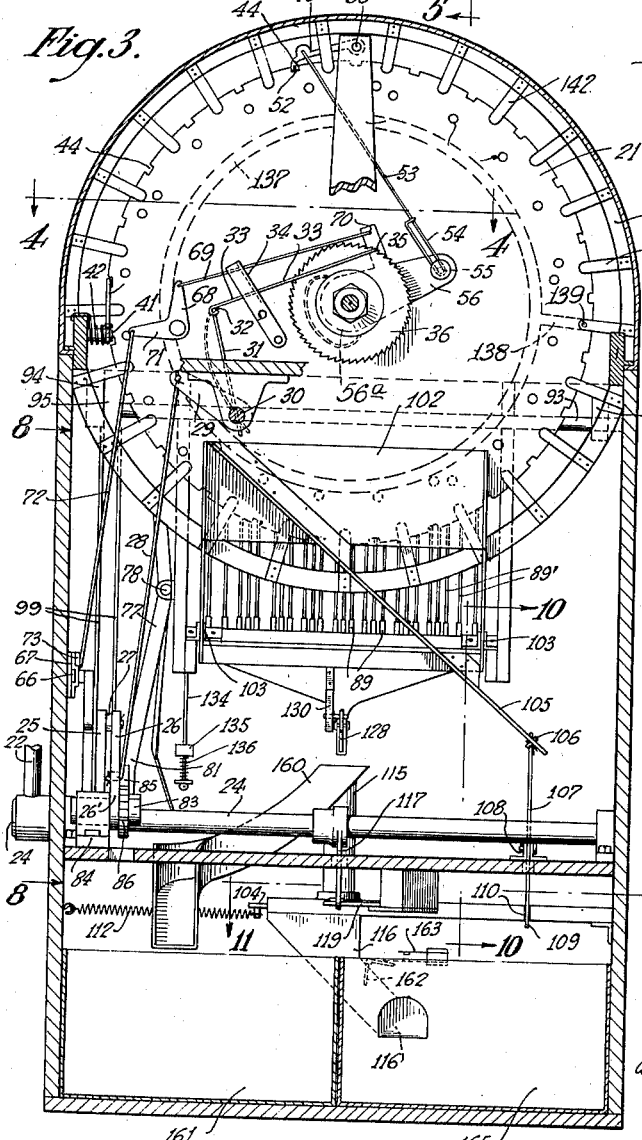
Fig. 3.
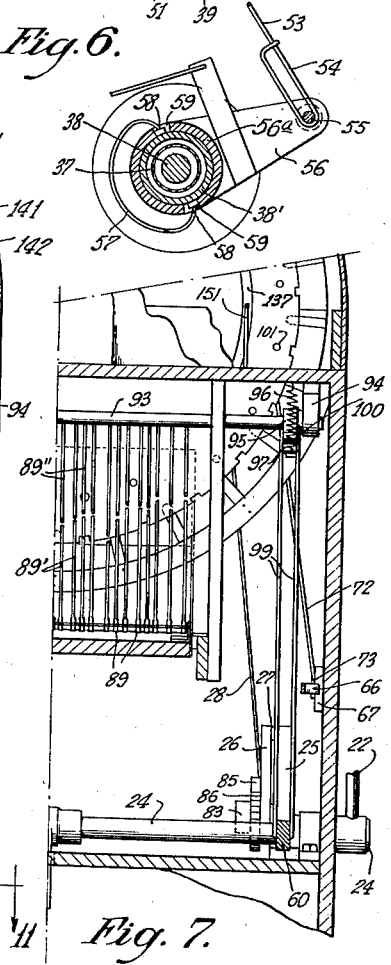
Fig. 6.
Fig. 7.
John T. Haynsworth Jr.
and William E. Johnson
INVENTORS
BY Clarence E. Threedy
THEIR ATTORNEY.

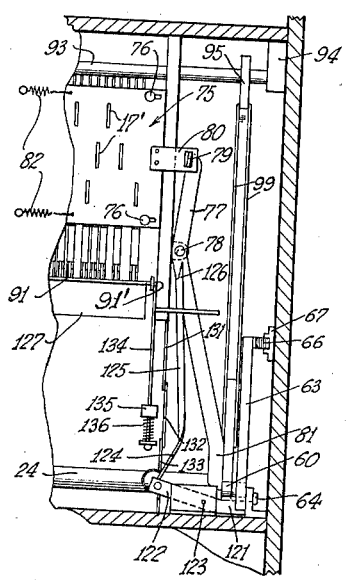
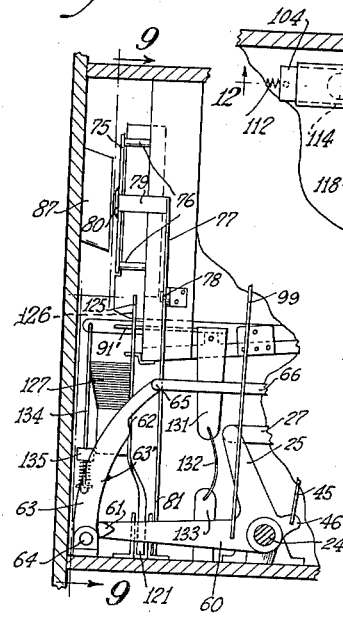
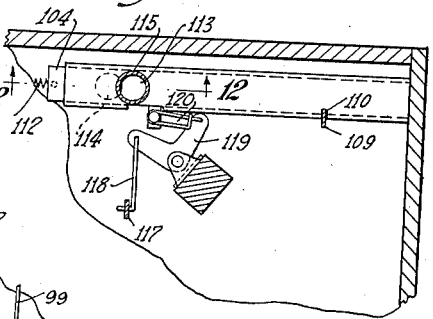
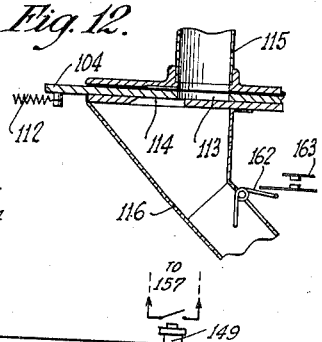
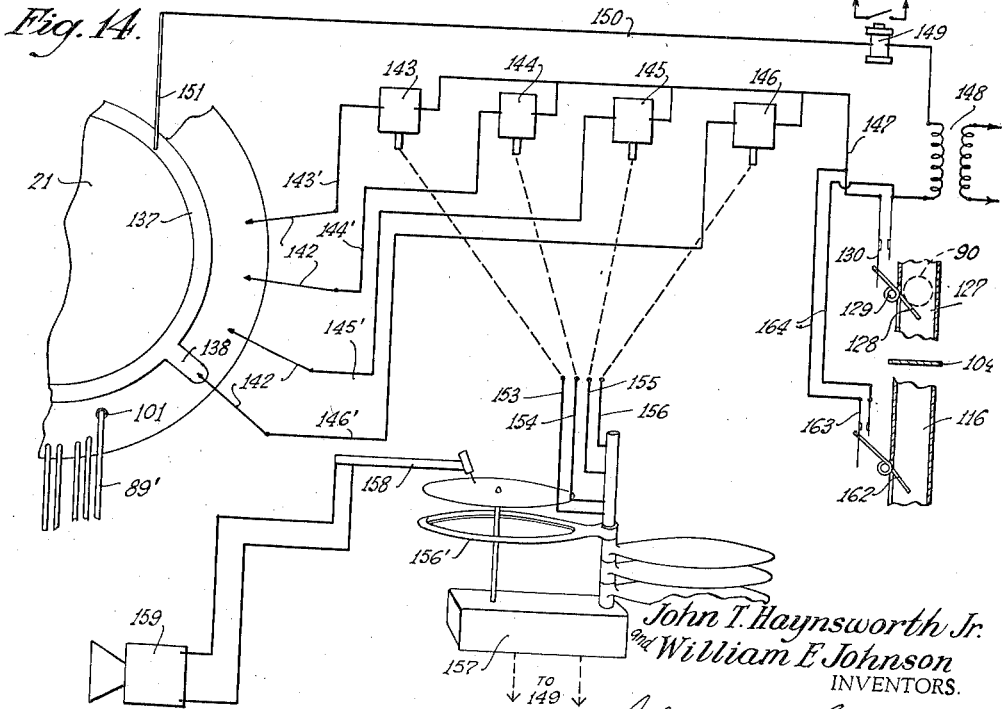

April 15, 1941.   J. T. HAYNSWORTH, JR., ET AL   2,238,113
SELECTOR MECHANISM
Filed Nov. 5, 1937   4 Sheets-Sheet 4
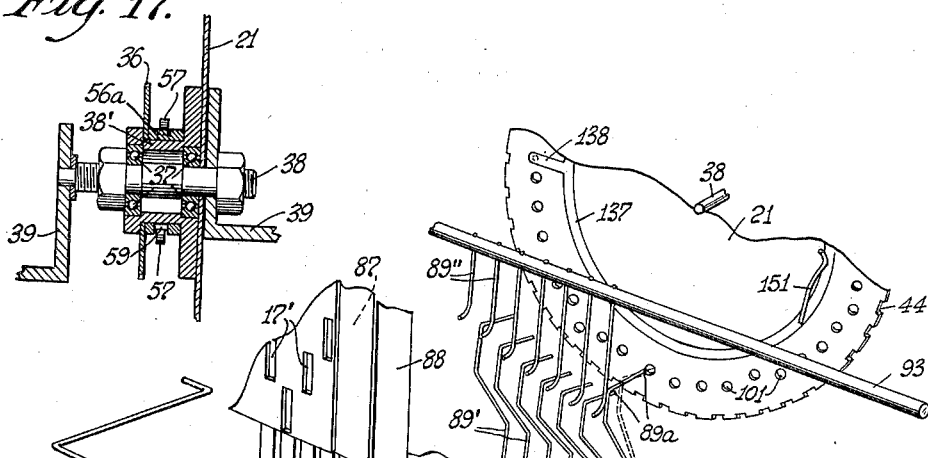
Fig. 17.
Fig. 15.
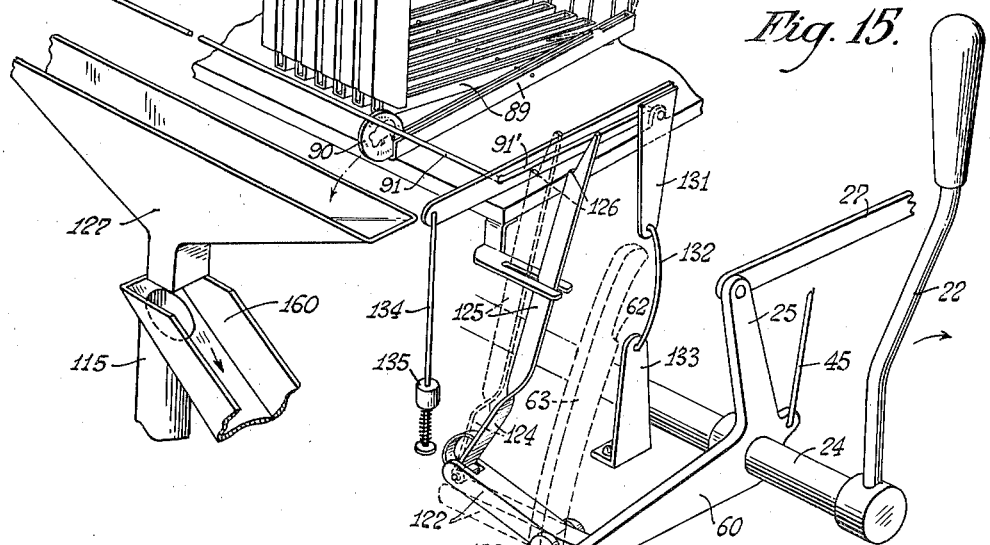
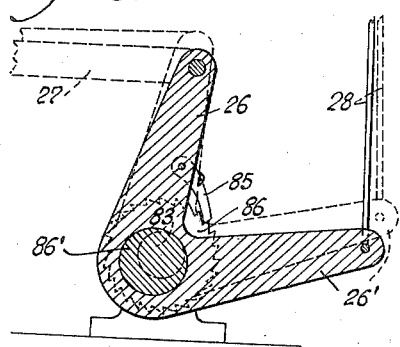
Fig. 16.
John T. Haynsworth Jr.
and William E. Johnson
INVENTORS
BY Clarence E. Threedy
THEIR ATTORNEY.

Patented Apr. 15, 1941

2,238,113

UNITED STATES PATENT OFFICE 2,238,113

SELECTOR MECHANISM

John T. Haynsworth, Jr., and William E. Johnson, Inverness, Fla.

Application November 5, 1937, Serial No. 172,948

2 Claims. (Cl. 194—15)

This invention has for one of its principal objects the provision of selecting mechanism of general application and especially suited for use with coin-operated apparatus.

Another object of the invention is the provision of selector mechanism adapted for use with coin-operated apparatus and effective to permit a second or repeated operation of the apparatus without deposit of another coin.

Another object is a selecting mechanism for use with a coin-operated amusement apparatus such as a phonograph and adapted to be conditioned for selective operation by a coin deposited for the purpose of operating the phonograph, the selector being effective under certain circumstances to operate a coin ejector which effects another or repeat operation of the phonograph without depositing another coin.

Another object is a coin-conditioned selector and permutation mechanism which may be used with any selectively controlled apparatus such as automatic phonographs, whereby the sequence of selections may be continuously varied, and is further effective under certain circumstances to effect a repeat operation without deposit of another coin.

Still another and more specific object is the provision of a selector including a disc having selective openings therethrough and selector fingers, any one of which may be raised by a coin into position to be pushed against the disc and through one of the selective openings, and a coin ejector actuated by one of the selector fingers passing through the disc and effective to release a coin for a repeat or free operation of associated apparatus such as a phonograph.

A further object is the provision of selecting mechanism of general application and which includes a rotatable disc with a plurality of circumferentially disposed openings, a plurality of selector fingers positioned for movement variously into said openings, mechanism for revolving the disc and mechanism for urging an entire bank of selector fingers toward the disc for movement of one finger into a properly positioned selector opening therein, and control mechanism operated by a particular selector finger which moves into one of the selector holes.

Other objects reside in the novel means for revolving the disc, the form and operation of the selector fingers, and means for conditioning the same for actuation by deposit of a coin in the machine, together with the construction and arrangement of cooperating parts and mechanisms to be hereinafter described and claimed in view of the drawings, in which:

Fig. 1 is a front elevation of one form of the selector unit;

Fig. 2 is a vertical side section along lines 2—2 of Fig. 1;

Fig. 3 is a rear vertical section along lines 3—3 of Fig. 2;

Fig. 4 is a horizontal section along lines 4—4 of Fig. 3;

Fig. 5 is an enlarged fragmentary vertical section of the stopping pawl, as seen along lines 5—5 of Fig. 4;

Fig. 6 is an enlarged elevation partly in section of the brake clutch looking in the direction of lines 6—6 of Fig. 4;

Fig. 7 is a fragmentary front elevation of the selector finger and operating spring assembly viewed in the direction of lines 7—7 of Fig. 2;

Fig. 8 is a reduced fragmentary vertical side section showing the operating crank and anti-fraud devices, seen along lines 8—8 of Fig. 3;

Fig. 9 is a reduced fragmentary front section showing further anti-fraud details, including the shifting coin plate, as seen in the direction of lines 9—9 of Fig. 8;

Fig. 10 is an enlarged fragmentary sectional detail of the coin return means as viewed along lines 10—10 of Fig. 3;

Fig. 11 is a fragmentary top plan view of the coin ejector and operating means viewed in the direction of lines 11—11 of Fig. 3;

Fig. 12 is an enlarged fragmentary vertical side section of the coin return slide, seen in the direction of lines 12—12 of Fig. 11;

Fig. 13 is an enlarged fragmentary perspective of the selecting switch means on the selector disc;

Fig. 14 is a circuit diagram for the selector;

Fig. 15 is an enlarged perspective fragment of the selector bars and operating leverage;

Fig. 16 is a vertical sectional detail through the eccentric mounting for bell crank 26;

Fig. 17 is a vertical sectional detail through the slip clutch and bearing on spinning disc 21.

While particular forms of construction are described herein in detail for the purpose of illustrating the invention in one of its preferred forms, it is to be understood that the invention is not restricted to such details except as may be hereinafter provided in the appended claims, the device claimed being intended to include all equivalent forms, arrangements and functional equivalents fairly within the spirit of the invention.

In the embodiment of Fig. 1, the control device includes a cabinet or housing 15 provided with a coin depository in the form of a plate 16 having a plurality of coin receiving apertures 17, each preferably identified by number to correspond to a selection identified on an instruction card 18 positioned therebelow.

At the upper end of the cabinet there is a hood portion 19 having an arcuate sight opening 20 behind which appears indicia, such as the sequential numbers shown, on a rotatable disc 21 mounted within the housing. There is provided actuating means in the form of a lever 22. Also there is provided in the lower region of the housing a contact plug 23, the purpose of which will be hereinafter explained.

The operator selects a particular coin aperture 17, deposits his coin therein, and pushes the lever 22 away from him toward the back of the machine for the purpose of rotating the dial 21, and this is accomplished by the mechanism seen in Fig. 3 which includes a main shaft 24 rotated by the operation of the handle 22 and having a multiple crank provided with an arm 25 which turns toward the left, as viewed in Fig. 2, when the handle is initially moved, resulting in an anti-clockwise movement of a bell crank 26 through a link 27 connecting the same with the arm 25.

Disc spinning means

The bell crank 26 then depresses a rod 28 connected to a lever 29 on a shaft 30 to one end of which is attached an end of a leaf spring 31, the opposite end 32 of this leaf spring being connected to one end of a pawl rod 33 supportably guided in a cleat 34 and having its opposite end 35 offset and resting in the teeth of a ratchet gear 36 (see also Fig. 4) which in turn is clamped in rigid assembly with the disc 21 and its bearings 37 between nuts threaded onto shaft 38, the latter being mounted on brackets 39 in the hood portion 19 of the cabinet or housing. It will also be observed in Fig. 2 that there is a sleeve 38' clamped with the ratchet on shaft 38.

When the rod 28 is depressed as aforesaid, and the shaft 30 turns in an anti-clockwise direction (Fig. 3), the spring 31 will be bowed into the dotted line position there seen, thus tending to draw the pawl 33 toward the left and rotate the disc 21 in an anti-clockwise direction.

Disc locking pawl

However, such rotation of the disc is prevented by means of a locking pawl 40 pivotally mounted as at 41 near one edge of the disc and urged by spring means 42 (see also Figs. 4 and 5) toward the disc to dispose its nose 43 in one of the notches 44 in the periphery of the disc, thus preventing movement of the latter by the pawl 33.

The disc 21 is freed for movement by the pawl 33 substantially at the moment when the operating lever 22 reaches the limit of its stroke by virtue of the fact that the multiple crank in its anti-clockwise movement (Fig. 2) depresses a rod 45 connected at its lower end to a stud portion 46 on the multiple lever, and at its upper end 47 (Fig. 5) to the offset arm 48 of the locking pawl 40, so that the latter is withdrawn from the notch in the disc with the result that the pawl 33 (Fig. 3) is quickly snapped toward the left by the bowed spring 31, whereupon the disc 21 rotates in an anti-clockwise direction.

Disc brake and slip clutch

It will be observed in Fig. 3 particularly that there is provided at the top of the disc a brake pawl 49 pivotally mounted as at 50 on a bracket 51 in the hood portion 19 of the housing, this pawl having a nose 52 also receivable in one of the notches 44 on the periphery of the disc and tending to prevent rotation of the latter. The brake pawl 49 is connected by a rod 53 by means of a loop portion 54 at its opposite end to a pin 55 on a crank arm 56 which floats on the sleeve 38' of the disc shaft 38 (Fig. 6). The slip clutch mechanism includes a spring loop 57 having opposite end portions 58 pressing into opposite slots 59 in the hub portion 56a of the crank arm 56 and bearing against the sleeve 38', which tend to key or clutch the crank arm 56 for rotation with the disc shaft sleeve 38' in an anti-clockwise direction. However, when the lever arm 56 is rotated with the sleeve 38' of the disc a distance sufficient to cause the pin 55 to bear against the upper end of the loop 54, the disc and sleeve 38' will continue to rotate and the special spring clutch structure 57—58 will slip; this slippage while permitting the rotation of the disc, nevertheless holds the lever arm 56 in a raised position and consequently urges the rod 53 upwardly to lift the brake pawl 49 out of the slot 44 and free the disc from the braking effect of the pawl, it being observed that the nose 52 of the latter is cammed so as to permit it to ride in and out of the slots as the disc rotates. When the speed of the disc decreases, the ability of the clutch lever arrangement 56—57—58 to hold the brake in ineffective position decreases so that the brake pawl tends to drop back toward the periphery of the disc and into and out of the slots, thus retarding the disc, this retarding action being indeterminate because of the peculiar clutch arrangement shown in Fig. 6.

Operating lever locking means

When the operating lever is moved in the initial stroke to rotate the arms 60 of a multiple crank arm in Fig. 2, one of the multiple crank (see Fig. 15) is raised until its end portion 61 slips into a notch 62 (Fig. 8) in a lever 63 pivoted at one end 64 and having a pivotal connection 65 with a latch rod 66 (referring now to Fig. 2) which slides horizontally in a bracket 67 near its opposite end, thus permitting the lever 63 to fall forward with the notch portion 62 underlying the nose 61 of the crank lever 60 and preventing the return movement of the same, it being observed that both the locking notch 62 and the inner edge 63' of the lever 63 are cammed or curved so that the nose 61 of the lever 60 tends to slide downwardly against the same from its raised position to retract the horizontally movable latch rod 66 toward the left in Fig. 8 or toward the right in Fig. 2. However, when the crank lever arm 60 is raised as aforesaid into the notch 62, with the operating lever 22 at the limit of its initial stroke, the disc 21 begins to rotate and the slip clutch lever arm 56 is in raised position as previously described, with the result that the bell crank 68 (Fig. 3) having one arm connected by a rod 69 to a laterally projecting arm 70 on the clutch arm 56, is turned by the latter in an anti-clockwise direction, depressing the other bell crank arm 71 and consequentially moving a latch rod 72 connected thereto in a downward direction.

As the latch rod 72 moves downwardly, a latch pawl 73 connected to the lower end thereof is depressed and falls into a notch 74 in the main latch bar 66, the latter now being urged toward the left (Fig. 2) with the main crank arm 60 held in raised position as aforesaid, so that return movement (toward the right, Fig. 2) of the main latch bar 66 is prevented by the pawl 73, and hence the main shaft 24 and operating handle 22 are securely locked against retraction so long as the disc 21 continues to rotate to hold the clutch arm 56 in raised position. Thus, the arcuate lever 63, the horizontal latch bar 66 and pawl 73 operable by the clutch arm 56 constitute one of the fraud-preventive mechanisms since further manipulation of the main operating lever is prevented thereby, so long as the disc continues to spin and until the clutch means releases the pawl 73.

Coin deposit blocking

It being remembered that a coin has been deposited and the lever 22 moved to its limit in one direction, there is provided a further fraud-preventive means in the form of a shifting coin plate 75 (Fig. 9) having horizontally sliding movement on pin and slot means 76 near its ends and being provided with a plurality of coin apertures 17' normally adapted to register with the coin deposit openings 17 in the plate 16 in the front of the cabinet by means of a lever 77 pivotally mounted as at 78 and having an upper lateral extension 79 engaged in a slot in a projecting arm 80 attached to the plate 75. The lever 77 has its lower end 81 (Fig. 9) disposed for camming engagement with the side of the crank arm 60 so that when the latter is in its normally lowered position seen in Fig. 8, the lever 77 is pivoted in a clockwise direction (Fig. 9) to shift the coin register plate 75 to the right against the tension of spring means 82, so that coins may be deposited in the machine in any of the several apertures 17.

However, as soon as the main crank lever 60 is raised responsive to an operation of the lever 22, the lever 77 turns in a counterclockwise direction and the spring means 82 shifts the plate 75 to the left, thereby positioning the coin slots 17' out of register with the main deposit slot 17 so that no further coins may be deposited so long as the operating lever 22 and hence crank lever 60 is in operated position as aforesaid.

Variable spinning means

As a feature of the permuting or interchanging operation of the selector operation, there is provided in addition to the brake pawl 49 (which variously tends to affect the movement of the disc) a mechanism for varying the tension of the leaf spring 31 and hence varying the energy with which the disc is initially turned, and this mechanism includes, as seen in Fig. 2, a stud shaft 83 (Fig. 3 also) which is mounted in a bracket 84 on the floor portion of the cabinet. The upper arm of the bell crank 26 is provided with a drop pawl 85 engageable in the teeth of a ratchet gear 86 also mounted concentrically on the shaft 83 and which is rotated together with the shaft 83 each time the bell crank 26 makes an operative advancing stroke (toward the left, Fig. 2). The bell crank is mounted on an eccentric collar 86' (Fig. 16) rigid on shaft 83 in such manner that the bell crank assumes varying positions of eccentricity relative to the shaft 83, so that the stroke of the crank and particularly its arm 26' connected to the rod 28, which tensions the spring, thus varies the degree of pivotation of the spring rod 30 and hence the extent to which the spring 31 is bowed.

Selector mechanism

Having thus far described the construction by which the disc 21 is set into motion and having set forth means for varying the initial energy applied to the disc to rotate it as well as the means for variously braking the movement of the disc, the selector mechanism is next to be described since it comes into play only after the disc comes to rest.

When the disc 21 finally stops, the braking pawl 49 will dispose its nose 52 into another of the slots 44 and this latter operation will correspond to a lowering or clockwise movement of the clutch lever arm 56, resulting in a pivoting of the bell crank 68 in a clockwise direction so that the latch rod 72 and the pawl 73 (Fig. 2) are withdrawn from the notch 74 in the horizontal latch bar 66, thus permitting the main crank arm 60 and associated arms 25, 46, etc., to return to the normal position seen in Fig. 2, this latter operation being accomplished by the operator who returns the operating handle 22 to its normal position at which time the locking pawl 49 will engage a notch 44 and secure the disc in the position in which it was stopped.

When the coin was deposited through one of the coin openings 17 prior to the operation of the lever 22, the coin traveled along a chute guide 87 into a vertical chute 88 positioned above a corresponding selector lever 89 (Figs. 2 and 9 particularly) where the coin 90 pivoted the lever in a clockwise direction and rested against a bail 91, thus disposing the selector lever 89 in the dotted line position seen in Fig. 2 and raising the corresponding selector finger 89' into selecting position before a corresponding selector spring 89'' thereabove.

Each of the selector fingers 89' is in the form of an offset substantially rigid spring wire having a horizontally extensive nose portion 89a and having a lower shank portion 92 rigidly mounted for longitudinal movement in the end of a corresponding selector lever 89, so that the several fingers such as 89' can be displaced in a vertical plane to align the horizontal nose portion 89a of one or more of the same for movement toward and away from the disc 21 (see Fig. 15 also).

Moreover, each of the several selector fingers 89' when raised as aforesaid is positioned in front of a corresponding selector spring 89'', all of which springs are rigidly mounted at one end in a bar 93 extending crosswise of the machine between brackets 94 (Figs. 2 and 7).

Selector actuating means

Attached to the crossrod 93 (Fig. 2) is a stepped lever 95 normally urged by a spring 96 to pivot the bank of selector springs 89'' away from the bank of selector fingers 89', and the stepped lever is provided with a first step 97 and a higher step 98. A double or looped rod member 99 (see also Fig. 7) is provided at its upper end with a roller 100 which rests on the lower step 97, the lower end of the double rod 99 passing through the main crank lever rod 60, so that when the latter moves upwardly upon the initial movement of the operating handle 22, the double rod 99 likewise rises and disposes roller 100 in the second step 98 where it remains until the lever 22 is returned to normal position by the operator (after the disc 21 has come to rest and unlatched the bar 66) whereupon the rod 99 is drawn downwardly again and the step lever is likewise depressed against the tension of the spring 96, thus pivoting the whole bank of selector springs 89" in a clockwise direction toward the upper or horizontally extensive portions of their corresponding selector fingers 89', it being remembered that one of these fingers has theretofore been moved or raised by deposit of the coin 90 on one of the levers 89, so that when the bank of springs moves forward the raised selector finger will be engaged thereby and yieldingly urged toward the now stationary disc 21, the springs missing all of the fingers except the one that has been raised.

Should the disc 21 have stopped so as to position a particular one of a plurality of selector holes or apertures 101 (Fig. 3) before the raised selector finger 89' in the manner illustrated in Fig. 14 (or 89a, Fig. 15), such finger would have its horizontal nose portion projected through the aligned hole by its corresponding spring 89" in the advancing bank of springs, so that the projected finger will engage a bail plate 102 (Figs. 2 and 3) pivotally mounted as at 103 behind the disc 21 for the purpose of actuating a repeat-operating arrangement or some other controlled instrumentality, in this instance a coin ejector slide 104 (Figs. 2, 10, 11 and 12).

Actuation of the controlled instrumentality or coin slide 104 is effected through a lever 105 moved by the bail plate and connected through a rod 106 to the upper end of a latch rod 107 pivoted in the housing as at 108 and having its lower end portion 109 movable into and out of a notch 110 (Figs. 10 and 11). The latch rod 107 is normally urged by a spring 111 so as to dispose the lower end 109 in the notch 110 to latch the slide 104 against movement (toward the left, Fig. 11) by its spring 112. When the slide is free to be moved by spring 112, a discharge opening 113 in the slide will be disposed in register with the discharge opening 114 so that a coin theretofore resting in the opening 113 by gravitating movement from the counting tube 115 will be positioned over the discharge opening 114 and pass out a counting discharge chute 116 leading into the counting receptacle 165.

Each time the control lever 22 is moved into disc operating position a depending restoring lever 117 on the main shaft 24 pushes a link 118 which pivots a bell crank 119 (clockwise, Fig. 11) so as to retract the slide 104 against the spring 112 by means of a link connection 120 attached to the slide. In this manner each operation of the lever 22 resets the ejector slide 104, the latter being locked in this position by the detent or latch lever 107—109 (the purpose of which will later appear).

Coin collection

During the foregoing operations the coin 90 (Fig. 2) has rested against the bail 91 on its corresponding selector lever 89 and as soon as the operating handle 22 is restored to normal the main crank arm 60 is lowered to normal position and encounters one end 121 (Figs. 8, 9 and 15) of a lever 122 pivoted as at 123 and having its opposite end pivotally connected to the twisted offset end 124 of a bail tripping rod 125 which has a notch 126 formed at its upper end.

When the crank lever 60 was first raised, the lever 122 was pivoted in an anti-clockwise direction, thus lowering the notch 126 in the rod 125 beneath the angled end portion 91' (Fig. 8) of the bail 91, so that when the operating handle 22 is subsequently restored to normal to lower the crank lever 60, a portion of the latter will bear against an end portion 121 of the lever 122 and raise the rod 125 together with the bail 91 resting in the notch 126, whereupon the coin 90 (Fig. 2) will be permitted to roll off its lever 89 into a chute 127 which directs the coin into the counting stack 115 above the ejector slide 104. As the released coin moves down the chute 127, it encounters a light lever 128 pivoted as at 129 at one side of the chute and having its outer end portion operatively engaging a switch 130, the circuit through which is closed by the passage of the released coin over the pass-over lever 128 (Fig. 14), the switch 130 being adapted to actuate a main control circuit in a manner hereinafter to be explained.

It would be possible by violently restoring the lever 22 to a normal position to reset the operating mechanism without raising the bail 91 sufficiently to free the coin, and in order to prevent such fraudulent operation of the device there is provided a further fraud-preventative means in the form of a depending arm 131 (Fig. 8) attached to the end of the offset portion 91' of the bail 91 and having a normally bowed over-center spring 132 secured thereto at its free end, the opposite end of the spring 132 being anchored in a member 133, the spring being bowed as seen in Fig. 8 when the bail is in its lowered or coin-blocking position.

Attached to the bail 91 at a convenient point is a vertical rod 134 having a weight 135 slidably mounted thereon and normally resting against a shock absorbing spring 136 at its lower end. Thus, when the lever 22 is violently retracted and the bail 91 is jerked upwardly (by rapid upward movement of the rod 125), the weight 135 due to inertia reactions with the spring 136 will be thrown violently upward on the rod 134 and tend to lift the bail 91 so that the over-center or snap spring 132 will momentarily straighten out (vertically), thus completely raising the bail until the spring 132 bows in the opposite direction, so that the bail is positively released and it is impossible to manipulate the device in any manner to retain the deposited coin on any of the selector levers.

Circuit connections

The master control or actuating mechanism which is controlled by the selector means may take any one of a variety of forms, and while our invention is particularly directed to the selector means and operating mechanism therefor including the disc, the selector fingers, and the actuating instrumentalities cooperable therewith, we have nevertheless described one form of controlled mechanism in conjunction with the circuit diagram of Fig. 14, and to this end the permuting disc 21 has mounted thereon an annular bus bar 137 provided with a radial contact finger 138 having a contact point 139 which protrudes through a special opening 140 in the disc and offset from the selector openings 101 so as not to be engaged by any of the selector fingers 89' (Fig. 13). Mounted in spaced relation about an insulated ring 141 (Fig. 3) are a plurality of wipers or contact fingers 142 any one of which may be engaged with the contact portion 139 of the bus bar on the disc, and the disposition and spacing of the contact 138 and wipers 142 relative to the notches 44 is such that the disc will always be arrested so that the contact 139 will positively engage one of the wipers 142, each of which is separately connected in circuit with a selecting device, in this instance an electromagnet 143, 144, 145 and 146 by means of conductors 143', 144', 145' and 146', the opposite sides of each of these electromagnets being connected by a common conductor 147 to one side of the coin-operated switch 130, the opposite side of this switch being connected to one side of the power source such as the transformer 148. The power circuit through the wiper fingers to the various selecting magnets or other mechanisms is completed from the opposite side of the transformer 148 through the winding of an operating magnet 149 and thence via a conductor 150 into a wiper finger 151 which has constant bearing engagement with the annular bus bar 137 and completes a power circuit for energizing any one of the selector devices 143, 144, etc.

It is to be understood, of course, that any type of control mechanism, whether electrical or mechanical, can replace the electrical control circuit described in conjunction with Fig. 14 for purposes of illustration. However, to complete the example given, there is shown in this figure an amusement device in the form of an electric phonograph having a plurality of movable record trays each controlled by any well-known form of selecting mechanism, and schematically represented in this instance by the several selector arms 153, 154, 155 and 156 and each adapted to be actuated by one of the electromagnets 143—146 so that one of the trays 156' may be turned by its driving mechanism 157 into playing position for engagement by pick-up 158 having connection with a reproducing mechanism including a speaker 159.

Thus, when the disc 121 has come to rest and a circuit has been established through the contact finger 133 and one of the wipers 142 to actuate electromagnet 146, the corresponding record tray 156' will be moved into playing position as illustrated when the coin 90 is released and passes over the switch operating arm 128 to close the switch 130, thus simultaneously energizing the selector magnet 146 and operating magnet 149 which is connected in circuit with the mechanism 157 and finally sets the amusement or other controlled device into operation.

Another function of the novel selector mechanism, including the selector fingers and disc apparatus, is that of controlling the operation of a repeat-operating or free-play mechanism such that after the controlled amusement or phonograph apparatus has once been operated by deposit of a coin, the registration of the selector disc with one of the selector fingers will permit the controlled amusement or phonograph apparatus to be operated another time without deposit of another coin. This is accomplished by the storage of coins in the counting tube 115 above the slide 104, it being observed that when the tube is filled the subsequently deposited coins will overflow into a deflecting chute 160 (Fig. 3 particularly) which guides the coins into a main receptacle 161.

Whenever one of the selector fingers registers with the disc to pivot the bail 102, the ejecting slide 104 is actuated in the manner heretofore described so that one of the coins will pass into the counting chute 116, transiently engaging a repeat-operating switch arm 162 to close a repeat switch 163 shunted by conductors 164 around the main operating switch 130, and thus again energizing the control magnet 149 and effecting a repetition of the number previously played, the ejected coin meanwhile continuing on down the counting chute into a counting receptacle 165 which serves to segregate the free-play coins from the coins in the receptacle 161 to enable a proper accounting of single and double-play coins for proprietary reasons.

*Detailed statement of operation*

The coin slots 17 are preferably numbered as indicated in Fig. 1, the numbers corresponding to the numbers of phonograph record selections appearing on the instruction card 18, and further corresponding to the numbers visible through the sight opening 20 and carried on the disc 21. If the patron is indifferent, he may deposit a coin in any of the openings 17 and disregard the numerical designation thereof; or, the coin may be deposited in a particular opening in expectation of the receipt of a free play, provided the permutation disc 21 stops at the proper position.

The deposited coin will rest on one of the selector levers 89 which corresponds to the particular slot in which the coin was deposited, the coin 90 resting on the lever and against the bail 91 to rock the lever in a clockwise direction as indicated in dotted lines in Fig. 2, the result being that one of the selector fingers 89' will be raised into selecting position before a corresponding selector spring 89'' in preparation for the subsequent selecting operation of the mechanism. (See Fig. 15 also.)

Meanwhile, the patron moves lever 22 forwardly, that is, away from him (anticlockwise in Fig. 2), with a resultant spinning of disc 21 caused by rocking shaft 24 (Figs. 2 and 3), which rocks eccentric crank 26 through link 97, pulling down upon rod 28 and lever 29 to bow spring 31. Spring 31 is connected to a pawl 33 engaged in the teeth of ratchet 35 which is arranged to rotate with disc 21, but during initial movement of the operating lever 22 to tension spring 31, the disc is restrained against rotation by locking pawl 40, the latter being released, however, by the downward movement of rod 45 connected to one of the shorter lever arms 46 of the multiple crank means 25—46—60, which effects a withdrawal of the locking pawl 40 so that pawl 33 is snapped forward to spin the disc 21.

Operating lever 22 is automatically locked in its forward position by dropping of pawl 73 into notch 74 (Fig. 2) in a link 66 which is connected as at 65 (Fig. 8) with an arcuate lever 63 in which is formed a notch 62 engaging the end 61 of multiple crank arm 60 when the latter moves forward to spin the disc so that the multiple crank arm (which is fast on operating shaft 24) cannot be retracted.

The spinning movement of the disc is automatically varied by action of a brake 49 (Fig. 3) normally engaging in notches on the disc and moved variously into and out of braking engagement with the edge of the disc by action of a brake arm 56 floating coaxially of the spinning shaft 38 of the disc (Fig. 6 particularly) and impositively clutched to the latter by action of a spring 57 having opposite ends 58 pressing into slots 59 through the hub portion 56a of clutch arm 56 so as to grab the spinning shaft sleeve 38' frictionally with a tendency to carry said arm rotatably therewith (anticlockwise, Fig. 3) to raise the brake 49 variously out of braking engagement with the disc.

As a further part of the means for varying the spinning action of the disc, there is provided a means for varying the tensioning of spring 31 by the operating lever, this means including the bell crank 26 which floats (Figs. 2 and 16) on an eccentric collar 86' rigid with ratchet 86. A drop pawl 85 on crank arm 86 turns the ratchet, and hence the eccentric collar, each time the main operating lever 22 is advanced. Thus, the fulcrum of crank 26—26' is shifted successively to change the stroke of rod 28 which tensions spring 31.

The operating lever 22 remains locked in advanced or forward condition until disc 21 comes to rest whereupon it is automatically released by action of clutch arm 56 in dropping back (Fig. 3, clockwise) to normal position to rock bell crank 68 through link rod 69 and pull up on rod 72 to raise locking pawl 73 (Fig. 2) out of latching engagement with the latch rod 66 so that the patron may not retract the operating lever to actuate the selecting mechanism and set the phonograph in operation.

The phonograph is actuated by retraction of the unlatched operating lever 22 which causes the bail 91 to be released with a consequent movement of coin 90 into the chute 127 (Figs. 2, 14, 15) where the coin engages switch operating means 129 to close switch 130, setting the phonograph in operation by action of one of the record selectors 143—146. As shown in Fig. 14, circuit connections to the record selectors are permutated by spinning of the disc 21 to position the contact finger 138 with one of the contacts 142 to complete an operating circuit for one or another of the selectors which will be energized by a closing of the coin switch 130.

Release of the coin 90 follows retraction of the main operating lever as a result of the lifting of coin retaining bail 91 (Figs. 8, 9 and 15) owing to the engagement of multiple crank arm 60, upon retraction of main operating lever 22, with a portion 121 of lever 122, the notch portion 126 of which was engaged beneath the angled portion 91' of the coin bail by forward movement of the main operating lever in the manner hereinbefore described. Thus, rod 125 is raised, with a corresponding movement of bail 91 to release the coin for movement into the coin chute 126 to operate coin switch means 128—130 and start the phonograph as aforesaid.

Positive coin releasing movement of bail 91 is assured by the fraud-preventive means hereinbefore described in detail and including the inertia weight 135 which will be thrown upwardly by a violent movement of rod 125 consequent upon a similarly violent return movement of the main operating lever, so that the over-center leaf spring 132 will straighten out momentarily and, through its connection with bail 91, assure a positive upward movement of the latter.

Actuation of the selecting mechanism is effected as a result of the fact that when lever 22 was moved forward, rod 99 was raised by action of multiple crank arm 60 on operating lever shaft 24 to dispose the roller 97 in the next higher notch 98 on step lever 95 (Fig. 2), and when the operating lever is restored or retracted, rod 99 is pulled down, effecting clockwise movement of step lever 95 and rocking the entire bank of selector springs 89'' in a clockwise direction to engage any of the selector fingers 89' which may have been raised by action of a coin 90 rocking any of the selector levers 89. This movement of the selecting springs will cause any selecting finger raised into selecting position to be pressed forward and into an aligned hole 101 in disc 21, the nose portion 89a of such finger passing through the hole and bearing against the bail plate 102 (Fig. 2) to rock the latter with a consequent movement of rod 105 (Fig. 3 also) and cooperating coin slide latch rod 107, thus withdrawing latch portion 109 from notch 110 in coin ejecting slide 104 (Figs. 11 and 12).

Slide 104 is normally latched as aforesaid (with its spring 112 tensioned) by each operation of the main operating lever shaft 24, and the restoring lever 117 fixed thereon and which is connected through link 118 and bell crank 119 to retract the slide (Figs. 10, 11, 12).

Unlatching of the coin slide 104 as aforesaid causes a coin to be ejected from hopper 115 for movement into chute 116 to actuate repeat switch means 162—163, thus energizing whichever of the record selectors 143—146 may be connected through disc contacts 138—142, etc., to actuate the phonograph a second time.

It will be apparent that the novel selector mechanism of our invention is applicable to other controlled apparatus than the specific phonograph mechanism described herein for purposes of illustration, and the unit disposed in the housing 15 has been designed for purposes of portability and provided with a cable connected plug or outlet 23 (Fig. 1) by means of which the device may be readily connected with the controlled amusement or phonograph mechanism of Fig. 14 or any other apparatus.

Having thus described our invention in particular form, it is to be understood that the appended claims are intended to include all equivalent forms and arrangements as interpreted in view of the teaching of the drawings and specification and within the fair scope and intent of the invention in its broader aspects.

We claim:

1. In a selecting mechanism, rotatable permutating means and drive means for rotating the same, said drive means including an operating lever arranged when moved in a particular direction to effect rotation of the permutating means, selector fingers mounted on pivoted selector arms all disposed in a normally lowered position opposite said permutating means, and constructed to be raised by the weight of a coin thereon to raise the corresponding selector finger, means including a bank of presser fingers mounted opposite said selector fingers for movement past the same toward said rotatable permutating means, any raised selector finger being engaged and pressed into selecting position for selecting cooperation with said permutating means, spring means normally positioning said bank of presser fingers away from said rotatable permutating means and the selector fingers, and means for moving the bank of presser fingers for operative engagement with a raised selector finger and including a bank actuating lever and means cooperably linking the same with said first-mentioned operating lever for actuation thereby only when the lever is moved oppositely to said particular direction.

2. Selecting mechanism including a bank of selecting fingers each arranged for movement from a normal ineffective position into selecting position, means for directing a coin element onto any of said selecting fingers for operation by weight of the coin element into selecting position, a plurality of presser fingers and means mounting the same for movement as a group relative to said selecting fingers, each selecting finger having a corresponding presser finger which is arranged for operative engagement with the corresponding selecting finger when the latter is in selecting position, and permutation means arranged for movement relative to said selecting fingers for cooperation with any of the latter which is in selecting position provided the permutation means is in a certain position relative to the selecting finger which is in selecting position, means for moving said permutation means, and means for moving said presser fingers as a group into and out of position for coaction with said selecting fingers in the manner aforesaid.

JOHN T. HAYNSWORTH, JR.
WILLIAM E. JOHNSON.